United States Patent

[11] 3,590,150

[72] Inventors John A. McMahon
Yonkers;
Solomon Manber, Sandspoint; Alex Rutman, Commack; Milton Schwartz, Roslyn Harbor; Ronald F. Cooper, Plainview, all of, N.Y.
[21] Appl. No. 652,648
[22] Filed June 19, 1967
[45] Patented June 29, 1971
[73] Assignee Alphanumeric, Incorporated
New Hyde Park, N.Y.

[54] PHOTOGRAPHIC RECORD MEDIUM SCANNER
18 Claims, 8 Drawing Figs.

[52] U.S. Cl. 178/6.7, 340/324, 346/110
[51] Int. Cl. H04n 5/86
[50] Field of Search 178/6.7, 6.7 A, 7.2 D, 15; 340/324.1; 346/110

[56] References Cited
UNITED STATES PATENTS

| | | | |
|---|---|---|---|
| 2,736,770 | 2/1956 | McNaney | 178/15 |
| 3,132,206 | 5/1964 | King | 178/15 |
| 3,137,768 | 6/1964 | Mullin | 178/6.7 A |
| 3,305,841 | 2/1967 | Schwartz | 340/324.1 |
| 3,313,883 | 4/1967 | Huntley | 346/110 |
| 3,434,158 | 3/1969 | Stauffer | 346/110 |
| 2,082,692 | 6/1937 | Finch | 178/6.7 |
| 2,681,382 | 6/1954 | Hilburn | 178/6.7 |
| 3,112,152 | 11/1963 | Dickinson | 178/6.7 |
| 3,336,498 | 8/1967 | Castanera | 340/324.1 |

*Primary Examiner*—Robert L. Griffin
*Assistant Examiner*—Joseph A. Orsino, Jr.
*Attorney*—Camil P. Spiecens

ABSTRACT: There is disclosed a system wherein a film is moved past the faceplate of a cathode-ray tube. The scanning raster of the cathode-ray tube is skewed in response to the amount of movement of the film by means of apparatus which generates signals as the film moves. The signals are used to longitudinally offset each scanning sweep (line) of the raster. Means are also provided to start and stop film movement if the offsetting exceeds certain ranges.

There is further disclosed a pin cushion correcting system wherein the slope of a sawtooth waveform signal used to generate a scanning sweep is controlled by means of circuits responsive at least to the amplitude of the sawtooth waveform signal.

INVENTORS
JOHN A. McMAHON
SOLOMON MANBER
ALEX RUTMAN
MILTON SCHWARTZ
RONALD F. COOPER
BY
ATTORNEY

FILM MOTION CONTROL FMC

PULSE GENERATOR PG

VERTICAL SWEEP GATE GENERATOR VSG

OPERATION CIRCUIT 168A

OPERATION CIRCUIT 168B

SAWTOOTH GENERATOR 132

PHOTOGRAPHIC RECORD MEDIUM SCANNER

This invention pertains to record medium scanners and more particularly to intensity-modulated electromagnetic radiation scanning means which presents information to a record medium for recording thereon.

Record medium scanners have many uses. A particularly valuable use is in pattern generators incorporated in photocomposing systems. In such systems an intensity-modulated electromagnetic radiation scanning means, such as a cathode-ray tube device or a light source and optical system, scans in a repetitive and orderly manner an electromagnetic radiation sensitive medium, such as a photographic film.

Many such pattern generators are known in the art. In fact, one such pattern generator is described in U.S. Pat. No. 3,305,841. While the pattern generator disclosed in that patent adequately performs the desired photocomposition function, it has created a demand for an even better pattern generator. In particular, with such pattern generators a portion of the film or record medium is longitudinally moved to a position opposite the radiation source such as a cathode-ray tube faceplate and stopped, and a pattern is then written across the band of film opposite a region of the faceplate or screen. After the pattern, such as a line of characters is written, the film is stepped by an increment of longitudinal distance so that a new band of the film is ready for exposure. While such a procedure is adequate for low or moderate speed operation, it is unsatisfactory for high-speed operation. Film stepping at high-speed places unreasonable burdens on the film transport mechanism. In addition, fixed incremental stepping can only be accomplished in multiples of a given distance. If fine control is required the increments must be very small. However, if large leading is required then many increments must be employed. Since each increment takes a given time, the operation is slowed down. Therefore, fixed incremental stepping limits the flexibility of the system. In the final analysis it becomes apparent that continuous film motion is very desirable for economical and reliable high-speed operation.

However, continuous film motion creates a new set of problems. Primarily, it should be realized that the film is moving continuously in a longitudinal direction while the pattern is being written in a transverse direction. Therefore, unless compensated for, the pattern would be recorded diagonally across the film. In a sense the pattern is skewed. The most apparent solution to the problem is to rotate the cathode-ray tube about its axis by an amount sufficient to compensate for the skew. This solution may be adequate if the film only moved continuously at a constant speed. Constant film movement would require complicated film transport servosystems. In addition, a versatile photocomposition machine requires that the speed of film movement be controllably variable to satisfy particular requirements of the job being performed.

It is, accordingly, a general object of one aspect of the invention to provide improved means for compensating for skew in the pattern recorded on a longitudinally moving record medium by a transversely moving recording means.

It is another object of this aspect of the invention to insure that patterns are recorded transversely across a longitudinally moving record medium in spite of the speed of movement.

It is a further object of the invention to provide means for continuously offsetting longitudinally the transversely moving scan of a longitudinally moving record medium by a value related to the longitudinal movement of the record medium.

Briefly, this aspect of the invention contemplates a system for recording patterns or a record medium which is sensitive to electromagnetic radiation wherein the record medium is longitudinally movable past an electromagnetic radiation source means. The radiation source means scans the record medium in a sequence of adjacent scanning sweeps wherein each scanning sweep has a component of displacement parallel to the direction of movement of the record medium. During each scanning sweep the radiation source means is controllably energized to radiate. Apparatus is provided for insuring that each scanning sweep of the record medium by the radiation source means scans the same longitudinal region of the record medium as it would if the record medium were stationary, regardless of the speed of movement of the record medium. The apparatus comprises means for monitoring the movement of the record medium and means for longitudinally offsetting each scanning sweep of the record medium by the radiation source means in accordance with the distance the record medium has moved in the increment of time from a given time such as the start of a first scanning sweep to the start of each succeeding scanning sweep.

While such apparatus adequately compensates for any skew in the recording on the record medium it is possible that the rate of flow of control information for energizing the radiation source means slows down or even temporarily stops. In such a case, it could happen that the potential offsetting would exceed desirable limits. Although it is possible in a computer-driven system to program the computer to anticipate such situations, such programming can place unreasonable burdens on the designer of the program. It is more desirable to free the programmer of this task and let him write the program as if the problem never occurs. Therefore, it is a feature of the invention to halt record medium movement whenever a given offset limit is exceeded and continue the remainder of scanning sweeps of a transverse band of the record medium while the record medium is stationary.

Once the record medium is stopped and the scan of the then present band of the record medium is completed another band "downstream" of the present band will be scanned. Therefore, it is thereafter necessary to restart the record medium movement. Accordingly, another feature of this aspect of the invention contemplates starting record medium movement whenever a longitudinal offset is introduced in a direction opposite to the usual direction of offsetting.

In pattern generators of the class described each scanning sweep has the same time duration. However, it is possible that the patterns or contiguous portions of the patterns recorded in each band of the record medium have different longitudinal dimensions. For example, assume that the pattern is text material and in each band of the record medium there is recorded a line of characters. It should be apparent that the point size of the characters varies from line to line or varies from word to word on a line. Previously, each line was arranged to cope with the maximum possible size character available at any time. Therefore, each scanning sweep length in each band was given a length to handle this maximum size character even though this character may not occur at all in a particular text. Since the time for a scanning sweep is a function of its length the same amount of time is taken to generate each line of characters regardless of the size of the characters. Accordingly, an arbitrary upper limit is imposed on the recording rate.

Another feature of the invention contemplates means for varying the length of the scanning sweeps so as to accommodate the actually occurring maximum longitudinal dimension in the pattern or in portions thereof in the recording on each band of the record medium. Thus, it is possible to maximize the output rate.

Furthermore, in a line of normal characters of text each character is aligned on a "base line", i.e., that line on which the bottom series of the capitals and of such lowercase letters as *x*, *m*, etc. seem to rest. Some characters such as *x*, *m*, *a*, *e*, etc. only occupy a region between the baseline and the "*x*-height", i.e., the relative height allowed for that part of the lowercase font from the baseline to the top of the lowercase *x* (the *x*-line). Other characters, such as *k*, *h*, *b*, etc., have "ascenders", i.e., that part of the vertical stroke of a lowercase letter which rises above the *x*-line. Still other characters, such as *j*, *g*, etc., have "descenders", i.e., that part of the vertical stroke of a lowercase letter which descends below the baseline. In addition, in a line of text it is possible that some characters are appended with either subscripts or superscripts which have their own baselines that are displaced from the main baseline. Also, if the line of text includes mathematic equations it should be apparent that the characters, such as generalized fractions and exponents would have elements with baselines displaced from the main baseline. Therefore, the mere adjusting of the scanning sweep to the actually occurring longitudinal dimension in the pattern in each band of the record medium may not be the optimum situation. Consider the case where the line includes the characters *k* and *g* the longitudinal dimension must go from the top of the ascender of the *k* to the bottom of the descender of the *g*. However, a shorter scanning sweep is required for the character *k* alone or the character *g* alone. Therefore, it is desirable to use separate scanning sweeps for each of the characters. Now, although each of the characters has the same baseline and their scanning sweeps have the same length, the start of the scanning sweeps for each are at different longitudinal coordinates. Assuming the scanning sweeps run from the top to the bottom of the characters, it is seen that for the character *k* the starting point is at the top of the ascender, while for the character *g*, the starting point is at the *x*-line. It should also be apparent the same phenomenon occurs for superscript and subscript characters.

Therefore, another aspect of the invention contemplates not only changing the lengths of the scanning sweeps in a portion of the pattern but of also displacing the starting points of each of these scanning sweeps.

Furthermore, under many circumstances, depending on the job being performed, patterns will be generated which do not transversely cover the entire record medium. It should be apparent that short transversely extending bands require less time to scan than long transversely extending bands. Therefore, a uniform rate of longitudinal movement of the record medium to cope with the longest band again imposes a limit on output rate. Now, since the radiating source means scans a constant area of the record medium per unit time, it should be apparent that as the transverse dimension of the band decreases the longitudinal dimension can be increased without degrading the recording.

It is, accordingly, another feature of the invention to control the rate of longitudinal movement of the record medium in accordance with the actual transverse dimension of the band of the record medium being scanned so that the output rate can be further maximized.

If the source of electromagnetic radiation is part of a cathode-ray tube assembly, then the well-known pin cushion distortion of the image on the faceplate of the cathode-ray tube will be present.

Pin cushion distortion has been a problem for a long time in cathode-ray tube devices such as television receivers or radar displays. The more common solutions to the problem are the static solution which uses permanent magnets located about the border of the tube and the dynamic solution that applies a correction signal to each sweep generating waveform. While the static solution can be used for overall picture presentation such as in television receivers it does introduce highly distorted regions in localized small areas of the picture. in high-resolution radar displays such distortion cannot be tolerated, therefore, the dynamic correction is used. Such dynamic correction requires that each scanning sweep deflection signal be corrected. Since the sweep rate is at a reasonable frequency, line-by-line correction is possible.

While these approaches solve their specific problems they cannot be used in high-speed graphic arts quality character generators. Such character generators cannot tolerate even localized areas of distortion since each local area must be considered as a separate entity as well as being a part of the whole. Hence, static correction alone is not sufficient for high-quality performance. In addition, because of the scanning rates required for high-speed pattern generators, the above-described dynamic correction imposes unreasonable response times for the correction signal generators.

It is, accordingly, an object of another aspect of the invention to provide improved deflection circuits for a cathode-ray tube assembly which minimize pin cushion distortion.

It is another object of this aspect of the invention to provide improved dynamic pin cushion distortion correction circuits for a high-speed cathode-ray tube scanning system.

It is a further object of this aspect of the invention to provide improved dynamic pin cushion distortion correction circuits which require only a fraction of the normally required bandwidth.

Briefly, this aspect of the invention contemplates a cathode-ray tube system comprising a cathode-ray tube having horizontal deflection means and vertical deflection means. Means for generating a horizontal deflection signal is connected to the horizontal deflection means. There is means for generating a recurring sawtooth waveform signal. Means responsive to the amplitude of the signal received from the sawtooth waveform signal generating means transmit a vertical deflection signal to the vertical deflection means. Means responsive to at least the amplitude of the sawtooth waveform control the sawtooth waveform signal generating means so that the slope of the sawtooth waveform is a function of at least the amplitude of the sawtooth waveform signal.

When such a circuit is incorporated in a cathode-ray tube assembly it provides pin cushion distortion correction along the horizontal centerline of the cathode-ray tube faceplate. In pattern generators which record lines of text, this correction is adequate when the baseline of the characters bears a fixed relationship, such as being colinear, with the horizontal centerline. However, as the scanning sweeps move away from the horizontal centerline pin cushion distortion is again present. In pattern generators of the kind herein discussed, this second type of pin cushion distortion is serious since it manifests itself along the tops of the characters to which the human eye is sensitive.

Accordingly, a feature of this aspect of the invention is concerned with correcting directly for pin cushion distortion resulting in the portions of a scanning raster which is vertically displaced from the horizontal centerline on the faceplate or screen of a cathode-ray tube.

Other objects, the features and advantages of the invention will be apparent from the following detailed description when read with the accompanying drawings which show by way of example and not limitation the now preferred embodiments of the invention.

Figure 1:
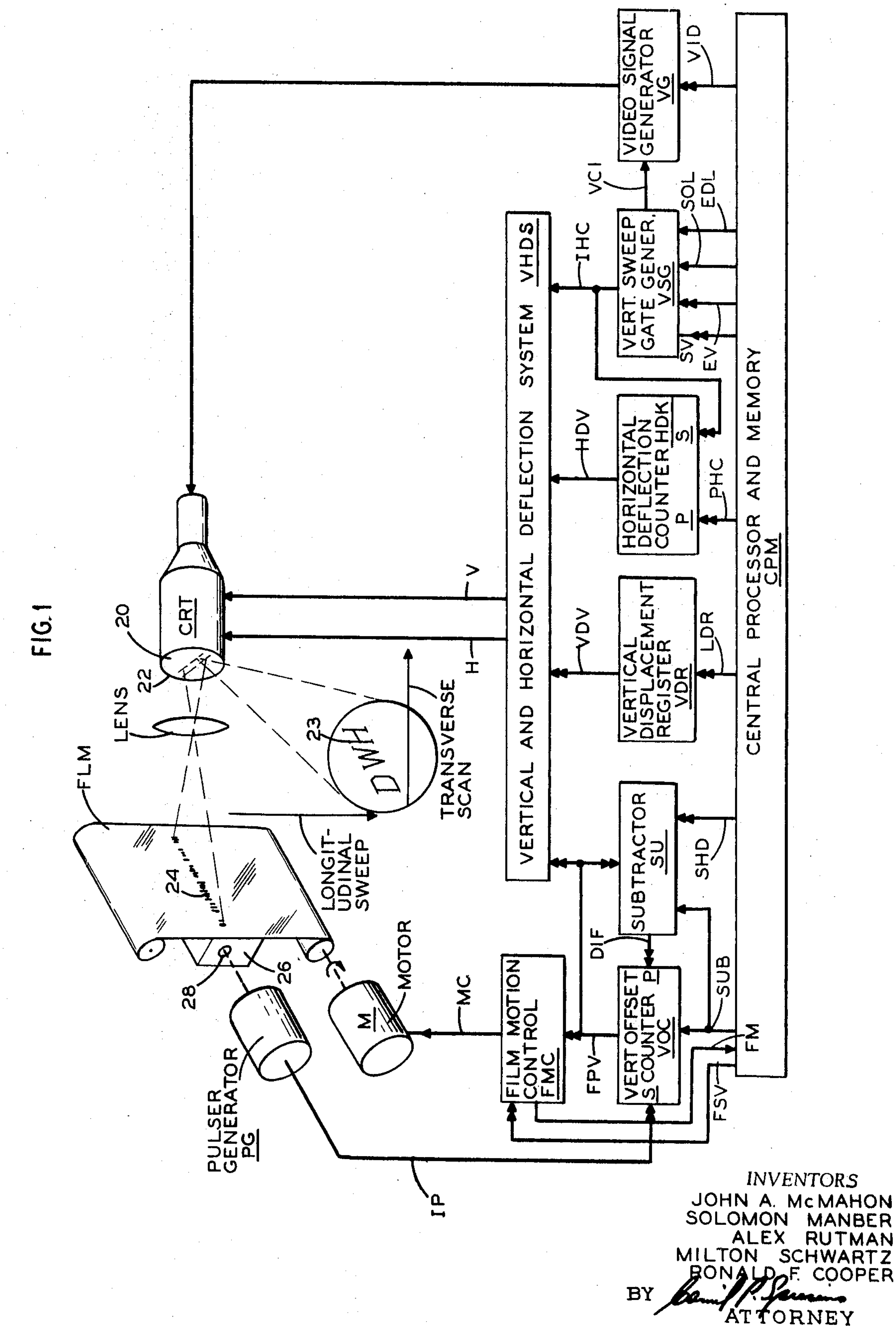
FIG. 1 shows in block diagram form a pattern-generating and -recording system in accordance with the invention.

In FIG. 1, there is shown the portions of a photocomposing system which are pertinent to the present inventive concepts.

Generally, an electromagnetic radiation sensitive record medium, shown preferably as a roll of photographic film FLM, is driven longitudinally past a source of electromagnetic radiation, shown preferably as a cathode-ray tube assembly CRT. Objects on the faceplate the cathode-ray tube assembly CRT are focused by means of a lens LENS to become images on film FLM..

By way of example, each object on the faceplate or screen 20 of the cathode-ray tube assembly CRT will be a line of characters of text wherein each character comprises a plurality of vertical column segments horizontally arrayed across a substantially central horizontal diameter region 22 of the screen 20. This region is hereafter called a projection window. See the exploded inset 23. It should be noted that the directions vertical and horizontal are used with respect to the site of FIG. 1, whereas in a practical system the directions could be interchanged. However, when vertical is used hereinafter it is equivalent to the longitudinal direction of film movement and when horizontal is used it is equivalent to a direction transverse to the longitudinal direction of film movement.

In general, the cathode-ray tube assembly CRT which includes conventional horizontal and vertical deflection yokes, an electron gun with an intensity control electrode and a focusing system is driven by signals received by the deflection yokes to generate a raster of vertical scanning sweeps and in one frame scans via lens LENS a transverse band such as 24 of film FLM. During each vertical scanning sweep the electron beam is intensity modulated binarily between on and off states of signals received by the intensity control elements from line Z.

The projection window 22 is basically a rectangular region which can be divided into a grid of vertical and horizontal coordinates. Accordingly, the horizontal position of each vertical scanning sweep of the raster can be assigned a particular horizontal coordinate number; similarly, the start and end points of each vertical scanning sweep can be assigned particular vertical coordinates or even a start vertical coordinate and vertical length value. This coordinate system on projection window 22 is the object of an instantaneous image coordinate system on the transverse band 24 of the film FLM. A more detailed description of this scheme can be found in the above cited U.S. Pat. Ser. No. 3,305,841.

Film FLM is moved over a platen 26 by a transport mechanism which is driven by motor M. Motor M which is a conventional speed-controlled motor is controlled by signals received from film motion control FMC. Film motion control FMC, which is hereafter more fully described, performs two control functions. (1) It switches the motor M between stationary and moving states in accordance with a count represented by binary-coded combinations of signals received on the lines of cable FPV. When the count exceeds a certain value motor M is stopped. When the count falls below a certain value motor M is started. (2) While motor M is moving, film motion control FMC controls the speed of movement in accordance with a number represented by a binary-coded combination of signals on the lines of cable FSV.

As the film FLM is moving, it passes over wheel 28 in platen 26 causing wheel 28 to rotate and drive pulse generator PG which transmits over line IP a given number of pulses per unit length of movement of film FLM. Pulse generator PG is hereinafter more fully described.

The scanning raster is generated by signals transmitted from the vertical and horizontal deflection system VHDS (hereinafter more fully described), via the lines V and H, to the vertical and horizontal deflection yokes in the cathode-ray tube assembly CRT. The amplitude of the signal on the H signal line determines the amount of horizontal deflection and in turn is determined by the value of a count number represented by a binary-coded combination of signals on the lines of the cable HDV from horizontal deflection counter HDK. For example, a count of zero in the counter HDK results in the electron beam being aimed at the center of the projection window 22, while a count of *n* results in the beam being aimed at one side edge of projection window 22 and a count of -*n* results in the beam being aimed at the opposite side edge of projection window 22. Counter HDK can be a presettable binary counter array which is preset to a value represented by a binary-coded combination of signals received from the lines of cable PHC at its presetting input terminals P and which is incremented by the trailing edges of pulses received from the IHC signal line at its step or count input terminal S.

The vertical deflection signal has three components. One component is a long term DC component for establishing the vertical position of the raster in the projection window 22. This component can be used for displacing the raster during a portion of the frame. This component is derived from a binary-coded combination of signals on lines of cable VDV representing a vertical displacement value. These signals are transmitted from vertical displacement register VDR. Register VDR can be a flip-flop register which is loaded by a binary-coded combination of signals on the lines of cable LDR. As the register is loaded its previous contents are cleared. The second component is a short term DC component which establishes the starting values of the scanning sweep and is used primarily to compensate for the skew resulting from longitudinal motion of the film FLM. This second component is derived from a binary-coded combination of signals on the lines of cable FPV representing longitudinal distance of movement of the film FLM since the start of a scanning frame. The third component is effectively a sawtooth waveform component which creates each scanning sweep. Included in deflection system VHDS is a gated sawtooth signal generator which is controlled to operate by gating pulses received via line IHC from vertical sweep gate generator VSG.

Vertical sweep gate generator VSG generates gating pulses by counting high frequency pulses (VCI), generated by a gated oscillator therein, and comparing the running count with a start and end value numbers represented by a coded combination of signals received on the lines of cable SV and EV to determine the duration of the gating pulse on line IHC. This count is in one-to-one correspondence with the vertical coordinates.

The FPV signals which represent the amount of movement of the film FLM during each frame are generated by the vertical offset counter VOC. Counter VOC can be a presettable cascaded binary counter having control gates at its presetting input terminals P. The control gates can be conventional two-input AND gates each having one input terminal connected to the SUB control signal line and the other input terminal connected to one of the signal lines of cable DIF. The count or step input terminal S of counter VOC is connected to the IP signal line.

After each scanning frame the projection window 22 is longitudinally displaced so that its object is positioned "-downstream" of its previous position on the film FLM to permit line leading of the recorded text or longitudinal spacing between patterns. This is accomplished by subtracting from the running count in counter VOC. The subtraction is performed by subtractor SU which can be a conventional parallel binary subtractor. The subtrahend input terminals receive the subtrahend value represented by binary-coded combinations of signals on lines of cable SHD. The minuend value is the binary-coded combination of signals on the lines of the FPV cable representing the running count of the counter VOC. These signals are fed via conventional two-input AND gates to the minuend input terminals of subtractor SU, each signal line of cable FPV is connected to one of the input terminals of each of these AND gates. The other input terminal of each of the AND gates is connected to the SUB control signal line.

During each scanning sweep of the raster the electron beam is binary intensity modulated by signals received by the intensity-modulating electrode of the cathode-ray tube assembly CRT, via the Z signal line from the video signal generator VG. Although the generation of the intensity-modulating signals is not part of the present invention a means for generating such signals can be found in the aforesaid U.S. Pat., Ser. No. 3,305,841.

Numbers represented by binary-coded combinations of signals are compared with running counts of pulses received on the VCI signal line to indicate the vertical coordinates of the projection window 22 where the beam is turned on and off during each scanning sweep. In any event, the signals on line Z are generated in response to binary-coded combinations of signals received on lines of cable VID.

Finally, the central processor and memory CPM, hereinafter called processor, can be a conventional stored-program central processing unit and magnetic core memory wherein the processing unit fetches numerical values stored in the memory and transfers then as signals to the lines of cables FSV, VID, PHC, LDR, SV, EV, SOL, EOL, SUB and SHD in the proper sequence as will now be described.

The system will be described while recording a line of text on a band of the film FLM. It will be assumed that the film is initially stationary.

Processor CPM first transmits a number, indicating film motion speed, represented by a binary-coded combination of signals on the lines of cable FSV to film motion control FMC. The number is determined largely by the length of the line of text to be recorded.

Then, processor CPM transmits a number related to the left-hand margin for the line of text. This number is represented by a binary-coded combination of signals fed from processor CPM, via the lines of cable PHC to the presetting input terminals of horizontal deflection counter HDK which transmits the same binary-coded combination of signals via the lines of cable HDV to the deflection system VHDS. The digitally represented number is converted therein to an analog signal which is fed via line H to the horizontal deflection yoke of the cathode-ray tube assembly CRT. The electron beam is horizontally aimed to the related transverse position. However, it should be noted that the electron beam is off at this time.

The processor CPM can then transmit the numbers representing the start and end values of the scanning sweeps as binary-coded combinations of signals via the lines of cables SV and EV to the vertical sweep gate generator VSG. Then, the processor CPM transmits an SUB control signal to open the input AND gates of the subtractor SU and the counter VOC and at the same time transmits a leading number represented by a binary-coded combination of signals on the lines of cable SHD to the subtrahend inputs of subtractor SU while the count number in counter VOC is fed via the lines of cable FPV to the minuend inputs of subtractor SU. The difference of these two numbers is fed as a binary-coded combination of signals via the lines of cable DIF to the preset input terminals of counter VOC. This leading number subtraction is repeated until the count in counter VOC drops below a certain value, say zero. At that time film motion control FMC senses the negative number now represented by the binary-coded combination of signals on the lines of cable FPV and starts transmitting an MC signal whose amplitude controls the speed of rotation of motor M. Motion control FMC also transmits a pulse indicating film movement has started, via line FM, to processor CPM.

Processor CPM then transmits the vertical coordinate values for electron beam turn-on and turnoff for the first scanning sweep as binary coded combinations of signals, via the lines of cable VID to video signal generator VG, and also transmits a control pulse via the line SOL to vertical sweep gate generator VSG. The signal on line SOL turns on the gated oscillator therein which starts generating the VCI pulses. The VCI pulses are counted in sweep gate generator VSG. When the count reaches the coordinate value for the scanning sweep, the leading edge of the sweep gate pulse is transmitted via line IHC to deflection system VHDS which starts generating the sawtooth waveform component of the signal on line V, and the scanning sweep starts. At the same time the VCI pulses are fed to video signal generator VG where they are also counted and the running count is compared with the values stored therein to generate the signal on line Z to binary modulate the electron beam. When the end value count is reached in sweep gate generator VSG the gate pulse on line IHC ends. The trailing edge of this pulse is received by the step input of horizontal deflection counter HDK and the count therein is incremented by one. The aim of the electron beam is, accordingly, horizontally deflected to be in position for the second scanning sweep of the raster. The trailing edge of this pulse also signals the processor CPM to transmit the binary modulation coordinate values for the second scanning sweep to the video signal generator VSG. The recording process continues in this manner.

While the recording process is proceeding it should be recalled that the film FLM is continuously moving. The movement of the film causes wheel 28 to rotate and pulse generator PG transmits pulses on line IP to the step input S of vertical offset counter VOC. Binary-coded signals representing this count are fed via the lines of cable FPV to the deflection system VHDS. The count value is converted to an analog signal and fed as a short term DC component on line V to the vertical deflection yoke. (By short term DC is meant its upper frequency AC components are much lower in frequency than the frequency components of the sawtooth waveform but its amplitude can smoothly vary during portions of each frame).

Thus, it it seen that the combination of wheel 28, pulse generator PG, vertical offset counter VOC and portions of the deflection system VHDS can compensate for skew during the recording of a line of text due to film movement.

If at any time during the recording of the line of characters the size of the characters change, the length of the scanning sweeps can be changed merely by replacing the start and end values of the scanning sweeps stored in vertical sweep gate generator VSG by new values transmitted from processor CPM via the lines of cables SV and EV., respectively.

Furthermore, if superscripting or subscripting is required, or if mathematical equations or generalized fractions are to be recorded, or if the characters vary from those with ascenders or descenders or having neither it is also possible to longitudinally displace chosen portions of the raster for the frame. In such a case the processor CPM transmits a binary-coded combination of signals representing the desired vertical coordinate displacement distance, via the lines of cable LDR, to the vertical displacement register VDR. This displacement value will be stored therein until changed by the processor CPM. The register VDR in turn transmits a binary-coded combination of signals representing the value stored therein, via the VDV signal lines to the deflection system VHDS where it is converted to a long term DC component of the signal on line V fed to the vertical deflection yoke.

If for any reason during the recording of the line of text the offsetting of the scanning sweeps due to film motion will result in the sweep extending beyond the top boundary of the projection window 22 the count in the vertical offset counter VOC will exceed a prescribed value. The film motion control FMC continuously compares the count stored in counter VOC and represented by the binary-coded combination of signals on the lines of cable FPV with a stored value. When it detects the overvalue it terminates the MC signal and motor M stops and the film stops moving. The remainder of the line of text is recorded on a stationary film.

In any event, when the end of the line of text is reached the processor CPM transmits a control pulse on line EOL to the vertical sweep gate generator VSG to turn off the gated oscillator therein.

The next line of text is recorded in the same manner. However, if the film was not stopped during the previous line it will continue to move and the leading values are only used to establish spaces between lines of text. If the film had stopped the leading values would also be used to restart the film in the same way as described above for initially starting the film.

The various elements of the system will now be described in greater detail.

Figure 2:
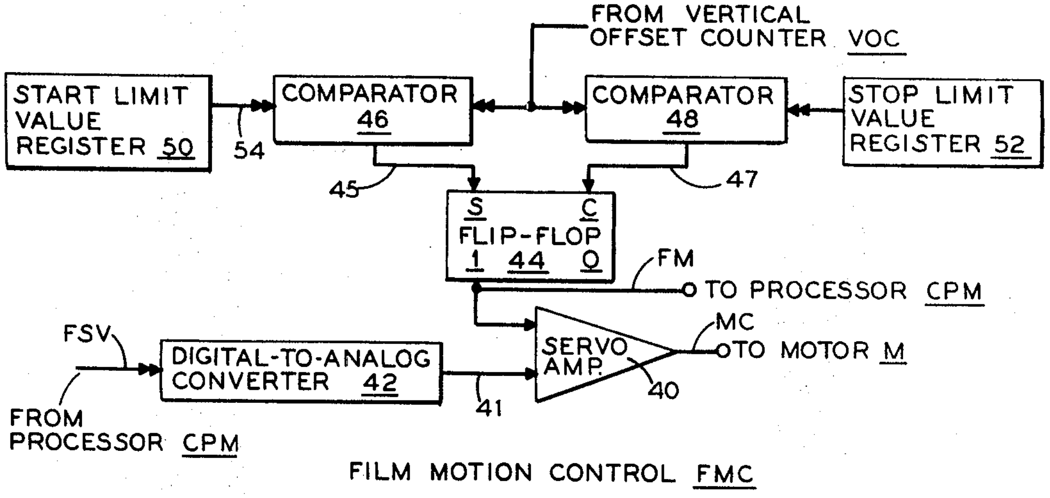
FIG. 2 shows as a block diagram the film motion control of the system of FIG. 1.

In FIG. 2, there is shown the film motion control FMC, comprising a conventional gated servoamplifier 40 which energizes motor M to rotate at a speed related to the amplitude of the signal received from a conventional digital-to-analog converter 42 under control of flip-flop 44. Flip-flop 44 is set to the "1" state by a signal received at its set input terminal, via line 45, from comparator 46; and is set to the "0" state by a signal received at its clear input terminal, via line 47, from comparator 48. Comparator 46, a conventional parallel comparator, emits a signal whenever the number represented by the binary-coded combination of signals on the lines of cable FPV is less than the number represented by the coded combination of signals on the lines of cable 54 from register 50. Comparator 48, a conventional parallel comparator, emits a signal whenever the number represented by the binary-coded combination of signals on the lines of cable FPV is greater than the number represented by the coded combinations of signals on the lines 56 from register 52. Registers 50 and 52 can be voltage energized resistor networks to generate the desired combinations of signals.

Figure 3:
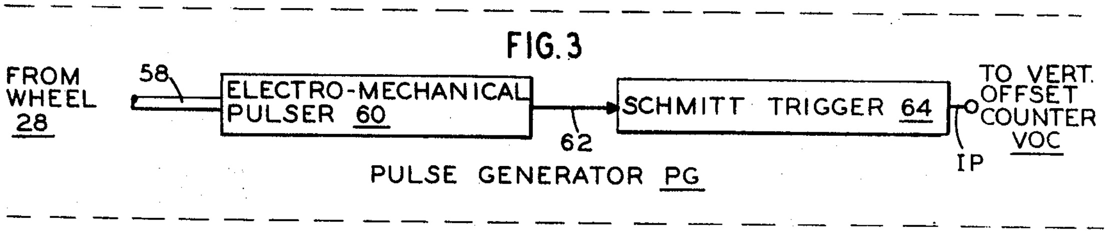
FIG. 3 is a block diagram representation of a pulse generator used in the system of FIG. 1.

Pulse generator PG shown in FIG. 3 comprises electromechanical pulser 60 connected via shaft 58 to film-driven wheel 28, and conventional Schmitt trigger amplifier 64 which emits pulses via line IP to vertical offset counter VOC. As shaft 58 rotates pulser 60 transmits a sinewave voltage via line 62 to the input of Schmitt trigger 64. Electromechanical pulser 60 can be of the type manufactured under the trademark D1G1SEC, Type RI 10K/256 by Wayne George Corp., Newton, Mass.

Figure 4:
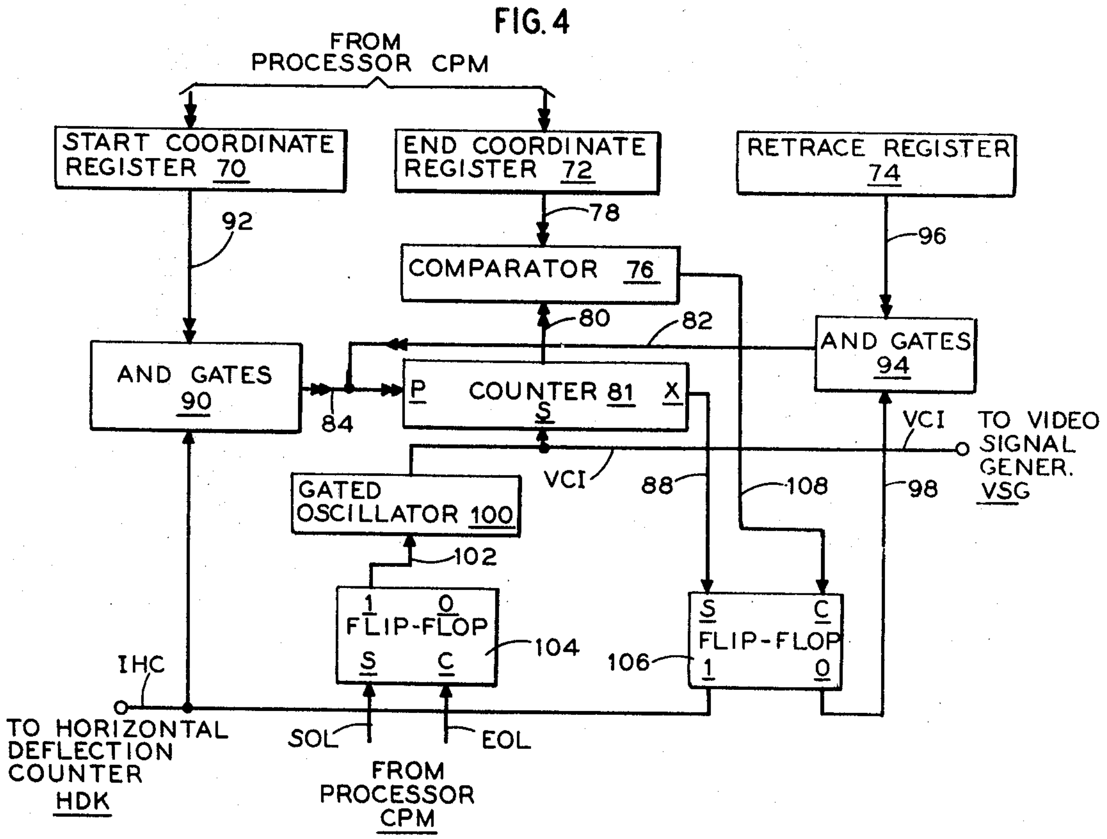
FIG. 4 shows in block diagram form the vertical sweep gate generator of the system of FIG. 1.

In FIG. 4, there is shown the vertical sweep gate generator VSG. The generator VSG includes the start coordinate register 70 and the end coordinate register 72. Each of these registers can be conventional settable flip-flop registers. Register 70 is set by signals on the lines of cable SV; and register 72 is set by signals on the lines of cable EV. Retrace register 74 can be a voltage energized resistor network to simulate a binary-coded combination of signals representing a number. Comparator 76, which can be a conventional parallel equality comparator receives at its first set of input terminals binary-coded combination of signals on the lines of cable 78 from register 72 representing the end coordinate of the scanning sweeps. The second set of input terminals of comparator 76 is connected via the lines of cable 80 to the counter 81. Counter 81 can be a presettable set of cascaded binary counter stages. The counter is presettable by signals received at its presetting terminals P from the lines of cable 82 or cable 84. The counter 81 is stepped by pulses received at its step input terminal S from line VCI. Whenever the counter overflows (exceeds its capacity) it transmits a pulse from its carry terminal X to the line 88.

The lines of cable 84 are connected to the output terminals of a parallel set of conventional two-input AND gates 90. One input terminal of each of the AND gates is connected to a flip-flop stage of the register 70 via one of the lines of cable 92. The other input terminal of every one of the AND gates is connected to the IHC signal line. Similarly, the lines of cable 82 are connected to the output terminals of a parallel set of conventional two-input AND gates 94. One input terminal of each of the AND gates is connected to one of the signal outputs of register 74 via one of the lines of cable 96. The other input terminal of every AND gate is connected to the line 98.

The stepping pulses for counter 81 are obtained from gated oscillator 100 which can be a conventional gated pulse generator which oscillates as long as it receives a signal from line 102. Conventional flip-flop 104 generates at its "1" output terminal the signal on line 102 when in the set state. The set terminal S of the flip-flop is connected to the SOL signal line while the clear terminal C is connected to the EOL signal line. Flip-flop 106 which controls AND gates 90 and 94 and generates the sawtooth gating pulses can be a conventional flip-flop 106 whose set input terminal S is connected to line 88 and whose clear input terminal C is connected via line 108 to the output of comparator 76. The "1" output terminal of the flip-flop is connected to the IHC signal line, and the "0" output terminal is connected to the line 98.

In operation, the start coordinate register 70 and the end coordinate register 72 are loaded by processor CPM. Assuming both flip-flops 104 and 106 are initially cleared, the contents of retrace register are loaded into counter 81 via gates 94. These contents represent a number which is related to the period of time required for the deflection yokes to settle down after retrace. When the SOL signal is received from processor CPM flip-flop 104 is set and starts generating a signal on line 102 causing oscillator 100 to free run. The pulses so generated are fed via line VCI to counter 81. The counter counts up from its preset count and when it overflows it transmits a pulse on line 88 to set flip-flop 106. The "1" output of the flip-flop starts generating an IHC pulse, the sweep gate pulse. The IHC pulse opens AND gates 90 and counter 81 is preset with the number stored in register 70. When the count in counter 81 equals the number in register 72, comparator 76 indicates the equality by emitting a pulse on line 108 which clears flip-flop 106 terminating the pulse on line IHC and again opening AND gates 94. At the end of the line of text or whenever the vertical coordinates are to be changed processor CPM transmits a pulse on line EOL which clears flip-flop 104 suspending operation of oscillator 100 until another SOL signal is received.

It should be noted that the difference of the numbers stored in registers 70 and 72 determine the length of the sweep gate pulse or the length of the scanning sweep. Since only pulse length is desired it is possible to prewire a constant "number" in register 72 as was indicated for register 74 and just load register 70 from processor CPM. Similarly, register 70 can be a prewired fixed value register and register 72 loaded from processor CPM. In addition, it is possible to eliminate one of the registers 70 and 72 and the comparator 76. The retained register then stores a length or duration value which can be used to preset counter 81 and the overflow of the counter used to indicate the end of the sweep. In this case, flip-flop 106 would be changed to a binary counter whose input in connected to the overflow output X of the counter 81.

Figure 5:
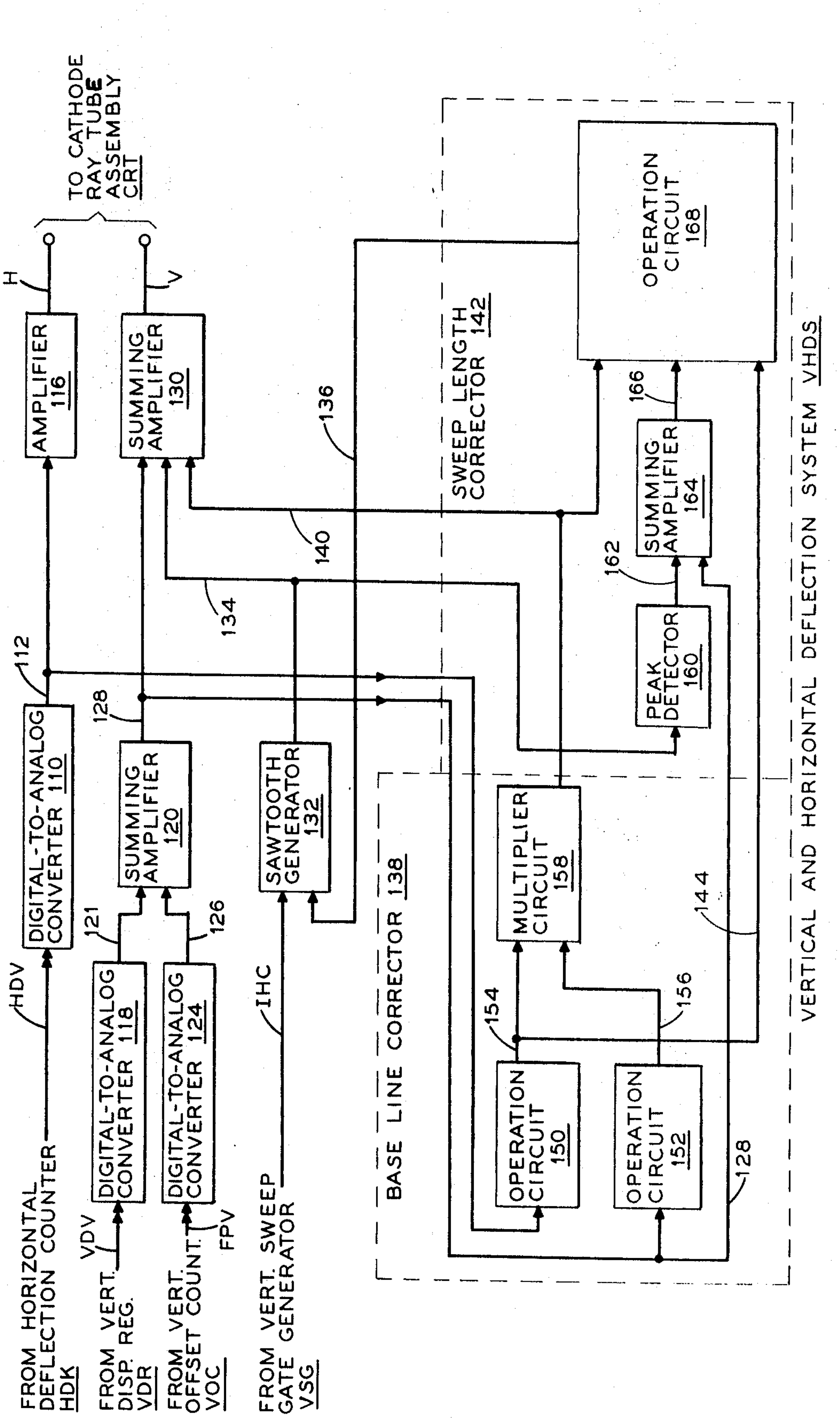
FIG. 5 shows in block diagram form the vertical and horizontal deflection system of the system of FIG. 1.

The vertical and horizontal deflection system VHDS as shown in FIG. 5 comprises: the horizontal deflection circuits including digital-to-analog converter 110 which receives binary-coded combinations of signals on the lines of cable HDV and transmit an analog voltage signal via line 112 to amplifier 116 which feeds the H signal line; the vertical deflection circuits including a digital-to-analog converter 118, receiving binary-coded combinations of signals on the lines of cable VDV and transmitting an analog voltage signal via line 121 to a summand input of summing amplifier 120, a digital-to-analog converter 124 which receives binary-coded combinations of signals from the lines of cable FPV and transmits an analog voltage signal via line 126 to the other summand input of amplifier 120 which transmits a sum analog voltage signal via line 128 to a summand input of summing amplifier 130 whose output feeds current to line V, and a gated sawtooth generator 132 which is gated on and off by gate pulses on line IHC, the slope of the sawtooth waveform (speed of the sweep) being controlled by a signal on line 136; a baseline corrector 138 which corrects for pin cushion distortion, resulting solely from deviations of the start of scans from the geometric center of the cathode-ray tube faceplate (indicated by signals on the lines 112 and 128) by an analog voltage signal fed via line 140 to a summand input of amplifier 130; and a sweep length corrector 142 which corrects for pin cushion distortion, resulting from vertical displacements of the baseline and the scan from the horizontal centerline as represented by signals on line 128 and line 134 as well as the horizontal displacement as represented by signals on line 144 from baseline corrector 138, by transmitting sweep speed control signals to line 136.

In operation, the horizontal position coordinate for the start of a scanning sweep is received by converter 110 from horizontal deflection counter HDK via the lines of cable HDV. One of the lines carries a sign indicator bit. Converter 110, a conventional digital-to-analog converter, which includes a sign sensor, then generates an analog voltage signal having an amplitude determined by the magnitude of the horizontal position coordinate and a polarity determined by the sign indicator bit. This voltage is fed via line 112 to amplifier 116 which supplies a signal having a related amplitude, via line H, to the horizontal deflection yoke of the cathode-ray tube assembly CRT. The electron beam is horizontally aimed. At the same time, binary-coded combinations of signals representing the vertical coordinate of the start of the scan because of film movement is received from the vertical offset counter VOC via the lines of cable FPV by conventional digital-to-analog converter 124. Converter 124 generates an analog voltage signal, having an amplitude related to the vertical coordinate value, which is fed via line 126 to a summand input of summing amplifier 120. If there is a displacement of the baseline then a binary-coded combination of signals representing the length of the displacement are received from vertical displacement register VDR by conventional digital-to-analog converter 118. Converter 118 converts the displacement value to an analog voltage signal which is fed via line 121 to the other summand input of summing amplifier 120. Summing amplifier 120 transmits an analog voltage signal via line 128 to a first summand input of summing amplifier 130 which transmits a signal via line V to the vertical deflection yoke of the cathode-ray tube assembly CRT to aim the electron beam vertically to the starting position of the sweep.

The sweep results from a sawtooth voltage signal generated by sawtooth generator 132 which is turned on by a gate pulse on line IHC from vertical sweep gate generator VSG. The sawtooth voltage is fed via line 134 to a second summand input of summing amplifier 130 which superimposes a sawtooth signal on the DC signal on line V.

In this manner the scanning raster is created. However, the raster will have pin cushion distortion. It is the function of baseline corrector 138 and sweep length corrector 142 to remove this distortion.

In particular, the baseline corrector 138 corrects for pin cushion distortion resulting from the displacement of the baseline from the horizontal centerline of the faceplate of the cathode-ray tube. This distortion also increases as the scanning sweeps are further displaced from the vertical centerline of the cathode-ray tube. Therefore, this component of the distortion is a function of the horizontal coordinate $X$ and the vertical coordinate $Y$ of the starting point for each scanning sweep. If it is assumed that the deflection yokes and faceplate are truly linear this distortion $D_1=AYX^2$. If this linearity does not hold then the distortion $D_1=kf_1(Y)\cdot f_2(X)$.

If an analog voltage is generated which is equivalent to this distortion and this voltage is subtracted from the analog voltage signal transmitted from summing amplifier 120, then this type of pin cushion distortion is corrected. Accordingly, baseline corrector 138 generates the required voltage and feeds it via line 140 to the third summand input of summing amplifier 130.

In particular, baseline corrector 138 receives the analog voltage signal on line 112, representing the horizontal coordinate $X$, at the input of operation circuit 150, and receives the analog voltage signal on line 128, representing the vertical coordinate $Y$, at the input of operation circuit 152. Operation circuit 150 is a function-generating network which transmits to line 154 an analog voltage signal representing the function $f_2(X)$. If the deflection yokes are linear then $f_2(X)=X^2$ and the circuit 150 can be a squaring operational amplifier. If the deflection yokes are nonlinear then the $f_2(X)$ is a more complex function, but this function can be realized by a diode function generator. Similarly, operation circuit 152 is a function-generating network which transmits to line 156 an analog voltage signal representing the function $f_1(Y)$. If the deflection yokes are linear then $f_1(Y)=Y$ and circuit $f_1$ can be a linear amplifier with a gain $A$. If the deflection yokes are nonlinear, then $f_1(Y)$ is more complex, but can be realized by a diode function generator. In either event, the analog voltage signals on lines 154 and 156 are fed to inputs of multiplier circuit 158. Multiplier circuit 158 can be a conventional analog multiplying operational amplifier and phase inverter which transmits on line 140 an analog voltage signal representing the inverse of the product of the analog voltage signals present on lines 154 and 156. Thus, the desired correction is obtained.

Now, the second type of pin cushion distortion results from the displacement of the ends of the scanning sweeps from the horizontal centerline. This displacement is a function of the horizontal coordinate X, the vertical coordinate Y of the start of the scanning sweep and the length SH of the scanning sweep.

In particular, the sweep length corrector 142, receives the sawtooth voltage on line 134 at the input of conventional peak detector 160 which transmits an analog voltage signal, representing the length SH of the scanning sweep, via line 162 to one summand input of summing amplifier 164. The second summand input of summing amplifier 164 receives an analog voltage signal on line 128 for summing amplifier 120, representing the vertical coordinate Y of the start of the scanning sweep. Summing amplifier 164 can be a conventional analog summing operational amplifier which transmits to line 166 the sum of the signals received from lines 128 and 162, representing the vertical coordinate Y+SH of the end of the scanning sweep. Operations circuit 168, hereinafter more fully described also receives the analog voltage signal on line 144 representing the square of the horizontal coordinate, i.e., $X^2$, and may receive the analog voltage signal on line 140 representing the baseline correction voltage. In response to these signals, circuit 168 generates an analog voltage signal which is fed via line 136 to sawtooth generator 132 to control the slope of the sawtooth waveform and therefore, the length of the scanning sweep. Thus, in spite of the fact that the period of the sawtooth waveform is determined by the period of the gate pulse on line IHC the length of the scanning sweep is controlled by the voltage on line 136. Hence, the remainder of the system can specify the proposed scanning sweep length as indicated by the period of the gate pulse without taking into account pin cushion distortion which is a function of the vertical and horizontal coordinates, and sweep length corrector 142 can change the length to correct for pin cushion distortion by modifying the slope of the sawtooth waveform. In addition, since if the density of the scanning sweeps is very great the pin cushion distortion varies only slightly from sweep to sweep, it is not necessary to exactly correct for each scanning sweep and the high frequency response usually required is no longer needed.

Figure 6:
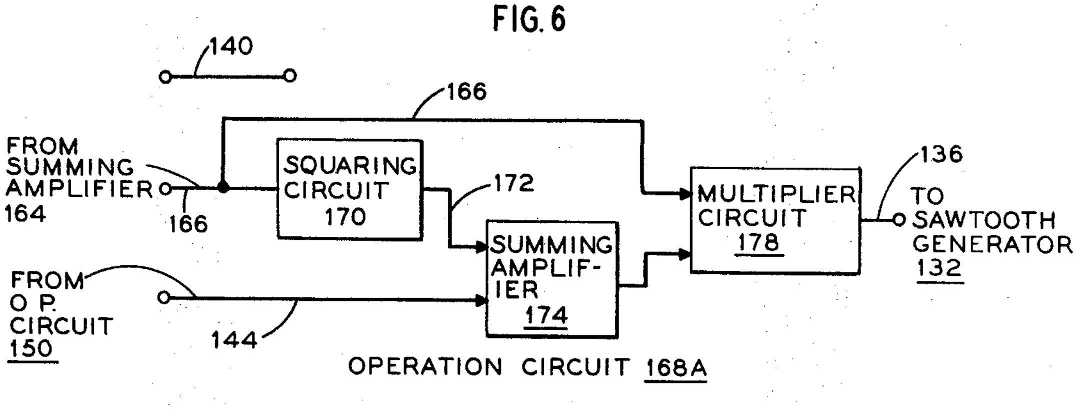
FIG. 6 shows in block diagram form an operation circuit used in the deflection system of FIG. 5.

The operation circuit 168 can take several forms. One is shown in FIG. 6 as circuit 168A. The output of summing amplifier 164, representing the value Y+SH, is fed to squaring circuit 170. Circuit 170 can be an analog-operational amplifier that performs a squaring function and, accordingly, transmits an analog voltage signal on line 172, representing the value $(Y+SH)^2$. Summing amplifier 174 receives at one input the signal on line 144 from operation circuit 150 representing the value $X^2$ and at another input the signal on line 172. Circuit 174 can be a conventional operational summing amplifier which transmits to the line 176 an analog voltage signal representing the sum of the signals received at its inputs, i.e., the value $(Y+SH)^2+X^2$. The signal on line 176 is fed to one input of multiplier circuit 178 while the signal on line 166 representing the value Y+SH is fed to the second input of multiplier circuit 178. Circuit 178 can be a conventional multiplier operational amplifier which transmits a signal on line 136 representing the value $A(Y+SH)\,[(Y+SH)^2+X^2]$, where A is a scale factor. Depending on the degree of accuracy desired the circuit can be modified. For example, if the height of the projection window is short with respect to the diameter of the faceplate of the cathode-ray tube, then the squaring circuit 170 and summing amplifier 174 can be deleted and line 144 can be connected directly to line 176. The signal on line 136 represents the value $X^2(Y+SH)$. Alternately, another approximate solution can be obtained by deleting the summing amplifier 174 and feeding the signals on line 172 and 144 to the inputs of multiplier circuit 178. The signal on line 136 will then be $X^2(Y+SH)^2$.

Figure 7:
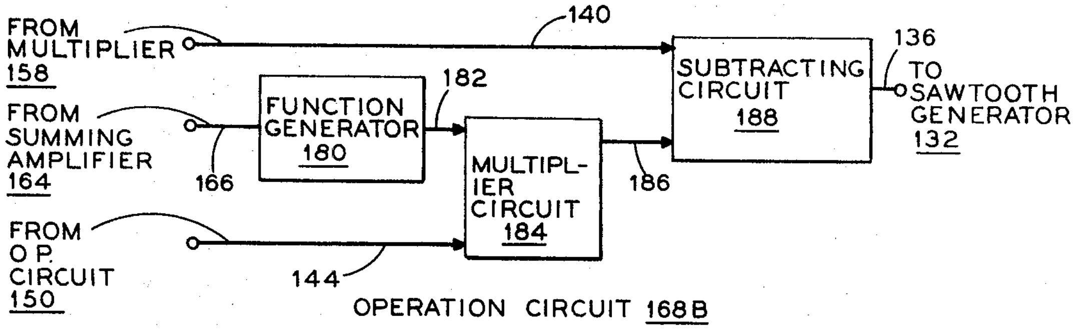
FIG. 7 shows a block diagram of an alternate embodiment of the circuit of FIG. 6.

Actually, the exponent for the (Y+SH) term should be $n$, where $1\leq n\leq 3$. Operation circuit 168B is a closer approximation. The signal on line 166, representing the value Y+SH, is fed to a diode function generator which transmits an analog voltage signal representing the value $(Y+SH)^n$, where $1<n<2$, on line 182. Multiplier circuit 184 which can be similar to circuit 178 (FIG. 6) receives the signals on lines 182 and 144 and transmits a signal on line 186 representing the value $X^2(Y+SH)Bn$. This signal could be fed directly to line 136. However, further accuracy can be obtained by subtracting the first order sweep length correction, the output multiplier circuit 184, by the baseline correction, the output of multiplier circuit 158. Accordingly, the signal on line 140 and the signal on line 186 are fed to subtracting circuit 188. Circuit 188 can be a conventional subtracting operation amplifier which transmits an analog voltage signal to the line 136 representing the value $X^2(Y+SH)^n-X^2$. Similarly, circuit 168A of FIG. 6 can be modified so that the output of multiplier circuit 178 is subtracted by the signal on line 140 by a subtracting circuit similar to circuit 188 of FIG. 7. The output of the subtracting circuit is then fed to line 136. Thus, it should be apparent that the operation circuit 168 can take various forms depending on the desired accuracy.

Figure 8:
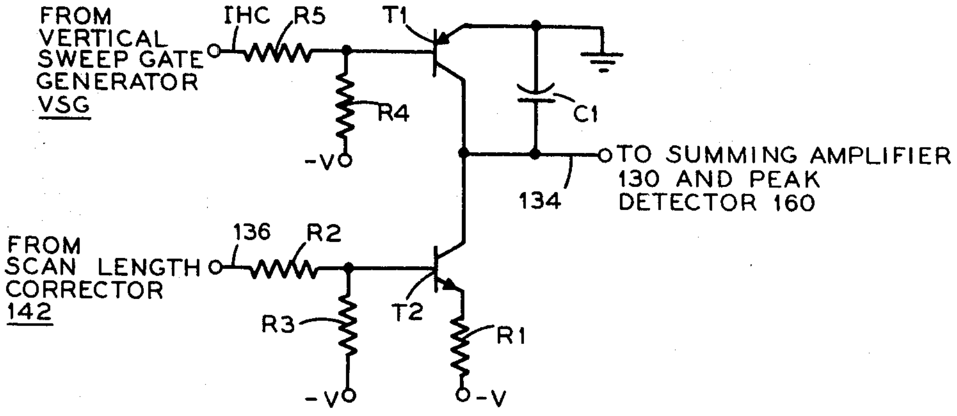
FIG. 8 shows the schematic representation of the sawtooth generator of the system of FIG. 5.

In any event, the signal on line 136 is used to vary the slope of the sawtooth waveform generated by the sawtooth generator 132 during each scanning sweep. Sawtooth generator 132 is shown in FIG. 8 comprising transistors T1 and T2 and capacitor C1. More particularly, the emitter of transistor T1 is grounded while capacitor C1 connects the emitter of transistor T1 to the collector of transistor T2. The emitter of transister T2 is connected via a resistor R1 to a negative voltage source −V. The base of transistor T2 is connected to the junction of resistor R2 and R3 acting as an operating bias source. The other end of resistor R3 is connected to source −V; and the other end of resistor R2 is connected to line 136. The base of transistor T1 is connected to the junction or resistors R4 and R5 acting as a conducting bias source. The other end of resistor R4 is connected to source −V; and the other end of resistor R5 is connected to line IHC. Transistor T1 operates as a switch in response to gate pulses on line IHC. Transistor T2 is a controllable variable charging current source under the control of the signal on line 136.

In operation, assuming positive-going sweep gate pulses, transistor T1 is conducting during the absence of a gate pulse and capacitor C1 rapidly discharges. During the presence of a gate pulse, capacitor C1 charges linearly through transistor T2. The charging rate is a function of the degree of conduction of the transistor T2 as determined by the amplitude of the signal at its base connected via resistor R3 to line 136. Hence, by varying the amplitude of the signal on line 136, the slope of the sawtooth voltage on line 134 can be varied.

While only the logically necessary elements of the system have been shown and described, good engineering practices would prefer the inclusion of other elements. For example, impedance transformers such as emitter-follower amplifiers would be used to interconnect some of the elements. Level shifters would be used for other interconnecting means. In addition, the deflection system would include calibrating circuits for the digital-to-analog converters, scale factor circuits can be included, and focus control circuits can be included. Furthermore, the deflection system would include high voltage accelerating power supplies for the cathode-ray tube accelerating system. And furthermore circuits would be included to initialize the states of all flip-flops and counters at the start of operation.

Thus, there has been shown an improved system for recording patterns on a moving radiation-sensitive record medium by offsetting each scanning sweep in accordance with the movement of the record medium in a given period of time.

Since the various elements shown in the system are made up of standard components, and standard assemblies, reference may be had to "High Speed Computing Devices", by the staff of Engineering Research Associates, Inc. (McGraw-Hill Book Company, Inc., 1950); and appropriate chapters in "Computer Handbook" (McGraw-Hill, 1962) edited by Harvey D. Huskey and Granino A. Korn, and for detailed circuitry, to the example "Principles of Transistor Circuits", edited by Richard F. Shea, published by John Wiley and Sons, Inc., New York and Chapman and Hall, Ltd., London, 1953 and 1957. In addition, other references are: For system organization and components: "Logic Design of Digital Computers", by M. Phister, Jr., (John Wiley and Sons, New York); "Arithmetic Operations in Digital Computers" by R. K. Richards (D. Van Nostrand Company, Inc., New York). For circuits and details: "-Digital Computer Components and Circuits", R. K. Richards (D. Van Nostrand Company, Inc., New York).

Especially worthwhile books for finding the components mentioned in the specification, and the hardware for realizing the components as well as the techniques for interconnecting the elements are: "DIGITAL Logic Handbook", 1967 edition, Copyrighted in 1967 by the Digital Equipment Corporation of Maynard, Mass., and "Digital Small Computer Handbook," 1967 edition, having a similar copyright.

While only a limited number of embodiments of the invention have been shown and described in detail, there will now be obvious to those skilled in the art, many modifications and variations satisfying many or all of the objects of the invention without departing from the spirit thereof as defined by the appended claims.

The embodiments of the invention in which we claim an exclusive property or privilege are defined as follows:

1. Apparatus for recording patterns on a record medium which is sensitive to electromagnetic radiation comprising means for continuously moving the record medium longitudinally, electromagnetic radiation source means operatively opposite the path of movement of the record medium and capable of scanning a region of the record medium having a given longitudinal dimension and a given transverse dimension, means for controlling said electromagnetic radiation source means to scan said region as a plurality of adjacent scanning sweeps each having a direction component parallel to the longitudinal direction of movement of the record medium, means for controllably energizing said electromagnetic radiation source means to radiate during portions of said scanning sweeps, means for measuring the distance of longitudinal movement of the record medium, means for longitudinally offsetting the starting point of each scanning sweep, said offsetting means including means, responsive to said measuring means, for longitudinally offsetting the starting point of each scanning sweep by an amount at least equal to the longitudinal distance the record medium has moved in the period of time from a given time to the time of the start of the particular scanning sweep.

2. The apparatus of claim 1 further comprising means for controllably changing the length of a plurality of adjacent scanning sweeps whereby the longitudinal dimension of at least a portion of the scanned region of the record medium is changed.

3. The apparatus of claim 1 further comprising means for controlling the speed of longitudinal movement of said record medium in accordance with the transverse dimension of the scanned region of the record medium.

4. The apparatus of claim 1 further comprising means for stopping the longitudinal movement of the record medium whenever the record medium has moved in said period of time a longitudinal distance which is greater than a given distance, means for restarting the longitudinal movement of the record medium after the starting point of a scanning sweep has been longitudinally offset in an opposite direction, and means for controllably changing the length of a plurality of adjacent scanning sweeps whereby the longitudinal dimension of at least a portion of the scanned region of the record medium is changed.

5. The apparatus of claim 1 further comprising means for stopping the longitudinal movement of the record medium whenever the record medium has moved in said period of time a longitudinal distance which is greater than a given distance, means for restarting the longitudinal movement of the record medium after the starting point of a scanning sweep has been longitudinally offset in an opposite direction, and means for controlling the speed of longitudinal movement of said record medium in accordance with the transverse dimension of the scanned region of the record medium.

6. The apparatus of claim 1 further comprising means for controllably changing the length of a plurality of adjacent scanning sweeps whereby the longitudinal dimension of at least a portion of the scanned region of the record medium is changed, and means for controlling the speed of longitudinal movement of said record medium in accordance with the transverse dimension a of the scanned region of the record medium.

7. The apparatus of claim 1 wherein said electromagnetic radiation source means comprises a cathode-ray tube having a controllable source of an electron beam, a phosphor-coated screen opposite the path of movement of the record medium, first electric analog signal responsive means for deflecting in a direction parallel to record medium movement said electron beam, when present, and second electric analog signal responsive means for deflecting in a direction transverse to record medium movement said electron beam when present.

8. The apparatus of claim 7 wherein said measuring means includes means for generating electric signals in response to the movement of the record medium, and wherein said offsetting means includes means for generating electric analog signals related to said electric signals generated by said measuring means, said electric analog signals being transmitted to said first electric analog signal responsive means.

9. The apparatus of claim 8 wherein said measuring means includes means for generating an electric pulse signal for each given length of movement of the record medium, and wherein said electric analog signal generating means includes electric pulse signal counting means for counting the electric pulse signals, and digital-to-analog converting means for generating an electric analog signal in accordance with the count of electric pulse signals accumulated by said electric pulse signal counting means.

10. The apparatus of claim 9 further comprising means for controllably changing the count value accumulated in said electric pulse signal counting means.

11. The apparatus of claim 8 further comprising means for generating and transmitting an electric signal having effectively a sawtooth waveform for each scanning sweep to said first electric analog signal responsive means.

12. The apparatus of claim 11 further comprising means for changing the duration of the electric signal having effectively a sawtooth waveform.

13. The apparatus of claim 11 wherein said means for generating and transmitting an electric signal having effectively a sawtooth waveform comprises a pulse-responsive gated sawtooth waveform generator and further comprising a gating pulse generating means including a free-running electric pulse generating means, means for counting electric pulses, first means responsive to a first count value for initiating a gating pulse and second means responsive to a second count value for terminating said gating pulse.

14. The apparatus of claim 13 further comprising means for controlling at least one of said first and second means to be responsive to a different count value.

15. The apparatus of claim 14 further comprising means for generating a displacement voltage and means for transmitting said displacement voltage to said first electric analog signal responsive means.

16. The apparatus of claim 11 further comprising means for changing the slope of said sawtooth waveform in accordance with the position of the scanning sweep of the electron beam on to the screen of the cathode-ray tube.

17. The apparatus of claim 16 further comprising means for changing the duration of the electric signal having effectively a sawtooth waveform.

18. Apparatus for recording patterns on a record medium which is sensitive to electromagnetic radiation comprising means for moving the record medium longitudinally, electromagnetic radiation source means operatively opposite the path of movement of the record medium and capable of scanning a region of the record medium having a given longitudinal dimension and a given transverse dimension, means for controlling said electromagnetic radiation source means to scan said region as a plurality of adjacent scanning sweeps each having a direction component parallel to the longitudinal direction of movement of the record medium, means for binary intensity modulating the electromagnetic radiation from said source means at predetermined times during the scanning sweeps, means for controllably changing the length of a plurality of adjacent scanning sweeps whereby the longitudinal dimension of at least a portion of the scanned region of the record is changed, and means for controlling the speed of longitudinal movement of the record medium in accordance with the transverse dimension of the scanned region of the record medium.